(12) United States Patent
Ma et al.

(10) Patent No.: US 11,539,239 B2
(45) Date of Patent: Dec. 27, 2022

(54) METHOD AND APPARATUS FOR OBTAINING LOCATION INFORMATION OF CONTROLLER

(71) Applicant: Huawei Digital Power Technologies Co., Ltd., Shenzhen (CN)

(72) Inventors: Xun Ma, Dongguan (CN); Yu Sun, Beijing (CN); Wei Shui, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/472,288

(22) Filed: Sep. 10, 2021

(65) Prior Publication Data
US 2021/0408824 A1 Dec. 30, 2021

Related U.S. Application Data

(63) Continuation of application No. PCT/CN2020/124773, filed on Oct. 29, 2020.

(30) Foreign Application Priority Data

Jan. 8, 2020 (CN) .......................... 202010018099.3

(51) Int. Cl.
*H02J 13/00* (2006.01)
*G05B 15/02* (2006.01)
*H02J 3/38* (2006.01)

(52) U.S. Cl.
CPC ........ *H02J 13/00016* (2020.01); *G05B 15/02* (2013.01); *H02J 3/381* (2013.01); *H02J 13/00002* (2020.01); *H02J 2300/24* (2020.01)

(58) Field of Classification Search
None
See application file for complete search history.

(56) References Cited

U.S. PATENT DOCUMENTS 8,588,830 B2 * 11/2013 Myer ...................... F21V 14/02
455/507
8,700,224 B2 * 4/2014 Mathiowetz ............ H02J 3/381
307/85

(Continued)

FOREIGN PATENT DOCUMENTS

CN 103036944 A 4/2013
CN 107769250 A 3/2018

(Continued)

*Primary Examiner* — Mohammad Ali
*Assistant Examiner* — Kelvin Booker
(74) *Attorney, Agent, or Firm* — Leydig, Voit & Mayer, Ltd.

(57) ABSTRACT

This application provides a method and apparatus for obtaining location information of a controller. The method includes: obtaining, by an inverter, signal feature information of each photovoltaic unit in a high-voltage direct current string, where the signal feature information of a photovoltaic unit includes a communication identifier of the photovoltaic unit and a signal feature of another photovoltaic unit, and the photovoltaic unit includes one controller and at least one photovoltaic module; determining an installation sequence of the photovoltaic units based on signal feature information of the photovoltaic units; and determining relative installation location information of each photovoltaic unit based on relative installation location information of a target photovoltaic unit in the high-voltage direct current string and the installation sequence of the photovoltaic units, where the target photovoltaic unit is at least one photovoltaic unit in the high-voltage direct current string.

18 Claims, 3 Drawing Sheets

(56) References Cited

U.S. PATENT DOCUMENTS

| | | | |
|---|---|---|---|
| 2006/0162772 A1 | 7/2006 | Presher, Jr. et al. | |
| 2010/0308662 A1* | 12/2010 | Schatz | H02J 3/38 |
| | | | 307/80 |
| 2011/0094503 A1* | 4/2011 | Jones | H02S 20/32 |
| | | | 126/714 |
| 2011/0220182 A1* | 9/2011 | Lin | H01L 31/0504 |
| | | | 136/251 |
| 2012/0310427 A1* | 12/2012 | Williams | G05B 23/0218 |
| | | | 702/182 |
| 2013/0342389 A1 | 12/2013 | Cojocaru et al. | |
| 2014/0025343 A1* | 1/2014 | Gregg | G06F 30/13 |
| | | | 703/1 |
| 2014/0200717 A1* | 7/2014 | Tilley | G05B 15/02 |
| | | | 700/275 |
| 2014/0267391 A1* | 9/2014 | Cummings | G06T 11/206 |
| | | | 345/629 |
| 2017/0070051 A1 | 3/2017 | Mumtaz | |
| 2017/0255803 A1* | 9/2017 | Yoscovich | H02S 50/00 |
| 2018/0041163 A1* | 2/2018 | White | H02S 50/10 |
| 2018/0083451 A1* | 3/2018 | Peloso | H02J 13/00028 |
| 2018/0239841 A1* | 8/2018 | Wachman | H02S 99/00 |
| 2018/0278207 A1 | 9/2018 | Pallotta | |
| 2018/0365352 A1* | 12/2018 | Bieganek | H02J 3/381 |
| 2019/0113900 A1* | 4/2019 | Yoscovich | G05B 19/042 |
| 2019/0123683 A1* | 4/2019 | Al Shakarchi | H02S 40/32 |
| 2020/0117839 A1* | 4/2020 | Tamasato | H02S 30/00 |

FOREIGN PATENT DOCUMENTS

| | | |
|---|---|---|
| CN | 108964262 A | 12/2018 |
| CN | 109905084 A | 6/2019 |
| CN | 111245007 A | 6/2020 |
| KR | 20160135127 A | 11/2016 |

\* cited by examiner

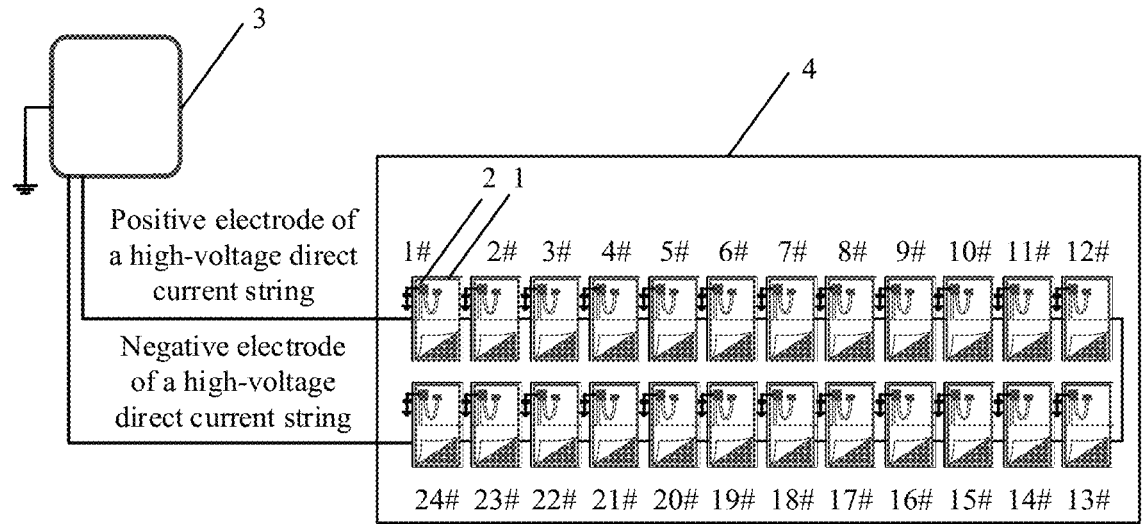

FIG. 1

An inverter obtains signal feature information of each photovoltaic unit in a high-voltage direct current string, where the signal feature information of a photovoltaic unit includes a communication identifier of the photovoltaic unit and a signal feature of another photovoltaic unit, and the signal feature is a signal feature obtained when any photovoltaic unit in the high-voltage direct current string communicates with the inverter or one photovoltaic unit in the high-voltage direct current string, or a signal feature obtained when the any photovoltaic unit broadcasts ⟵ S101

The inverter determines an installation sequence of all photovoltaic units based on signal feature information of all the photovoltaic units ⟵ S102

The inverter determines relative installation location information of each photovoltaic unit based on relative installation location information of a target photovoltaic unit in the high-voltage direct current string and the installation sequence of all the photovoltaic units, where the target photovoltaic unit is at least one photovoltaic unit in the high-voltage direct current string ⟵ S103

FIG. 2

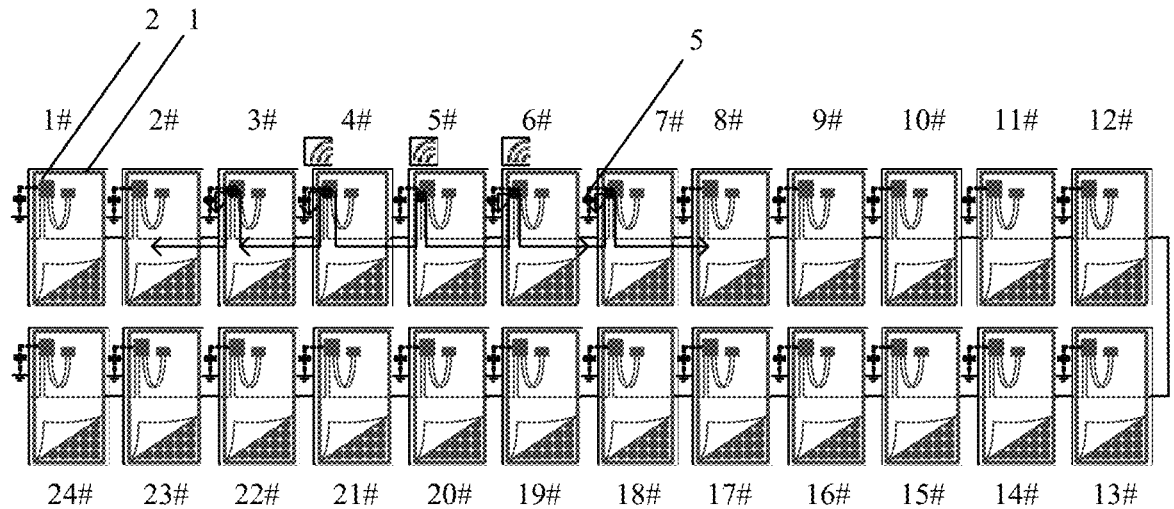

FIG. 3

| An inverter obtains relative installation location information of a target photovoltaic unit in a high-voltage direct current string, where the target photovoltaic unit is at least one photovoltaic unit in the high-voltage direct current string | S201 |

↓

| The inverter obtains signal feature information of each photovoltaic unit in the high-voltage direct current string, where the signal feature information of a current photovoltaic unit includes a communication identifier of the photovoltaic unit and a signal feature obtained when another photovoltaic unit communicates with the inverter | S202 |

↓

| The inverter determines an installation sequence of all photovoltaic units based on signal feature information of all the photovoltaic units | S203 |

↓

| The inverter determines relative installation location information of each photovoltaic unit based on the relative installation location information of the target photovoltaic unit in the high-voltage direct current string and the installation sequence of all the photovoltaic units, and obtains location information of a controller of each photovoltaic unit based on the relative installation location information of each photovoltaic unit | S204 |

FIG. 4

METHOD AND APPARATUS FOR OBTAINING LOCATION INFORMATION OF CONTROLLER

CROSS-REFERENCE TO RELATED APPLICATIONS

This application is a continuation of International Application No. PCT/CN2020/124773, filed on Oct. 29, 2020, which claims priority to Chinese Patent Application No. 202010018099.3, filed on Jan. 8, 2020. The disclosures of the aforementioned applications are hereby incorporated by reference in their entireties.

TECHNICAL FIELD

This application relates to the field of solar energy, and in particular, to a method and apparatus for obtaining location information of a controller.

BACKGROUND

Solar energy is becoming increasingly popular by virtue of no pollution, zero emission, and the like. A solar photovoltaic power generation system (which is also referred to as a photovoltaic system) includes an inverter and a photovoltaic module. Because a voltage of photovoltaic modules that are connected in series is quite high, when a dangerous situation such as a fire occurs, the voltage of a photovoltaic string obtained after the photovoltaic modules are connected in series needs to be reduced, to ensure personal safety. In this case, a controller (which is an optimizer or a shutdown device) configured to control a photovoltaic module is generated for the solar photovoltaic power generation system. A function of the controller is to perform DC-DC conversion on a direct current output by the photovoltaic module, to output a direct current whose voltage and current are adjustable. In this way, a maximum power point of the photovoltaic module can be tracked.

The solar photovoltaic power generation system includes a high-voltage direct current string and the inverter. The high-voltage direct current string includes a plurality of photovoltaic units, and one photovoltaic unit includes the photovoltaic module and the controller. In the solar photovoltaic power generation system, information is transmitted between the inverter and the controller through power-line communication (PLC). The inverter is a PLC central coordinator, and the controller is a PLC station. The inverter and the controller perform information interactions such as service query and command control through the PLC. After the high-voltage direct current string and the inverter are installed and deployed, sequence number code of controllers under a same high-voltage direct current string and location information of the photovoltaic unit on which the controller is located need to be correspondingly stored for ease of management. An absolute physical location of the photovoltaic unit may be obtained based on the location information and a detailed engineering design.

In a current technology, after a solar photovoltaic power generation system is installed, location information of photovoltaic units on which controllers are located is manually recorded in sequence and imported into a management system. This is inefficient and error-prone.

SUMMARY

This application provides a method and apparatus for obtaining location information of a controller, to obtain location information of a controller in a high-voltage direct current string in a photovoltaic system. This saves labor and improves installation efficiency and operation and maintenance efficiency.

According to a first aspect, this application provides a method for obtaining location information of a controller, including:

An inverter obtains signal feature information of each photovoltaic unit in a high-voltage direct current string, where the signal feature information of a photovoltaic unit includes a communication identifier of the photovoltaic unit and a signal feature of another photovoltaic unit, and the another photovoltaic unit is a photovoltaic unit other than a photovoltaic unit corresponding to the communication identifier of the photovoltaic unit. For example, one high-voltage direct current string includes 24 photovoltaic units, and signal feature information of a photovoltaic unit 1 includes a communication identifier of the photovoltaic unit 1 and signal features of the other 23 photovoltaic units other than the photovoltaic unit 1. The signal feature is a signal feature obtained when any photovoltaic unit in the high-voltage direct current string communicates with the inverter or one photovoltaic unit in the high-voltage direct current string, or a signal feature obtained when the any photovoltaic unit broadcasts, and the photovoltaic unit includes one controller and at least one photovoltaic module.

The inverter determines an installation sequence of all photovoltaic units based on signal feature information of all the photovoltaic units.

The inverter determines relative installation location information of each photovoltaic unit based on relative installation location information of a target photovoltaic unit in the high-voltage direct current string and the installation sequence of all the photovoltaic units, where the target photovoltaic unit is at least one photovoltaic unit in the high-voltage direct current string.

According to the method for obtaining location information of a controller in the first aspect, the inverter obtains the signal feature information of each photovoltaic unit in the high-voltage direct current string, where the signal feature information of a photovoltaic unit includes the communication identifier of the photovoltaic unit, a communication identifier of another photovoltaic unit, and the signal feature corresponding to the another photovoltaic unit; the inverter determines the installation sequence of all photovoltaic units based on the signal feature information of all the photovoltaic units; and the inverter determines the relative installation location information of each photovoltaic unit based on the relative installation location information of the target photovoltaic unit in the high-voltage direct current string and the installation sequence of all photovoltaic units. The relative installation location information of each photovoltaic unit is determined, and location information of a controller of each photovoltaic unit is also determined correspondingly. The relative installation location information of the target photovoltaic unit in the high-voltage direct current string may be manually obtained and then pre-stored in the inverter, or obtained by the inverter, so that the location information of the controller in the high-voltage direct current string in a photovoltaic system may be obtained full-automatically or semi-automatically. This saves labor and improves installation efficiency and operation and maintenance efficiency.

In a possible design, the signal feature is a signal feature obtained when any photovoltaic unit in the high-voltage direct current string communicates with the inverter, and that an inverter obtains signal feature information of each photovoltaic unit in a high-voltage direct current string includes:

The inverter communicates with each photovoltaic unit in the high-voltage direct current string in sequence;

the inverter sends a location positioning request to each photovoltaic unit in the high-voltage direct current string in sequence; and the inverter receives the signal feature information sent by each photovoltaic unit after each photovoltaic unit receives the location positioning request.

According to the method for obtaining location information of a controller in this implementation, the inverter communicates with each photovoltaic unit in the high-voltage direct current string in sequence, where each photovoltaic unit stores a signal feature obtained when another photovoltaic unit communicates with the inverter, and the signal feature may be one of signal strength, signal attenuation, or signal impedance; the inverter sends the location positioning request to each photovoltaic unit in sequence; and the inverter receives the signal feature information sent by each photovoltaic unit after each photovoltaic unit receives the location positioning request. Therefore, the signal feature information of each photovoltaic unit may be obtained in a unicast manner.

In a possible design, the signal feature is a signal feature obtained when any photovoltaic unit in the high-voltage direct current string communicates with the inverter, and that an inverter obtains signal feature information of each photovoltaic unit in a high-voltage direct current string includes:

The inverter communicates with each photovoltaic unit in the high-voltage direct current string in sequence;

the inverter broadcasts a location positioning request to each photovoltaic unit in the high-voltage direct current string; and the inverter receives the signal feature information sent in sequence by each photovoltaic unit.

According to the method for obtaining location information of a controller in this implementation, the inverter communicates with each photovoltaic unit in the high-voltage direct current string in sequence, where each photovoltaic unit stores a signal feature obtained when another photovoltaic unit communicates with the inverter, and the signal feature may be one of signal strength, signal attenuation, or signal impedance; the inverter broadcasts the location positioning request to each photovoltaic unit in the high-voltage direct current string; and the inverter receives the signal feature information sent in sequence by each photovoltaic unit. Therefore, the signal feature information of each photovoltaic unit may be obtained in a broadcast manner.

In a possible design, that the inverter determines an installation sequence of all photovoltaic units based on signal feature information of all the photovoltaic units includes:

The inverter determines a photovoltaic unit adjacent to each photovoltaic unit in sequence and based on the signal feature information of all the photovoltaic units; and the inverter performs sequencing, based on the photovoltaic unit adjacent to each photovoltaic unit and a communication identifier of each photovoltaic unit, to obtain the installation sequence of all the photovoltaic units.

In a possible design, the method further includes:

the inverter obtains the relative installation location information of the target photovoltaic unit in the high-voltage direct current string.

In a possible design, that the inverter obtains the relative installation location information of the target photovoltaic unit in the high-voltage direct current string includes:

The inverter communicates with the target photovoltaic unit under a first condition, where the first condition is any one of disconnecting a direct current input switch of the inverter, disconnecting a positive electrode of the high-voltage direct current string, and disconnecting a negative electrode of the high-voltage direct current string; and the inverter determines the relative installation location information of the target photovoltaic unit based on a received signal feature of the target photovoltaic unit; or the inverter determines the relative installation location information of the target photovoltaic unit based on a signal feature of the target photovoltaic unit that is received before the first condition is executed and a signal feature of the target photovoltaic unit that is received after the first condition is executed.

According to the method for obtaining location information of a controller provided in this implementation, the inverter communicates with the target photovoltaic unit under the first condition; and determines the relative installation location information of the target photovoltaic unit based on the received signal feature of the target photovoltaic unit; or determines the relative installation location information of the target photovoltaic unit based on the signal feature of the target photovoltaic unit that is received before the first condition is executed and the signal feature of the target photovoltaic unit that is received after the first condition is executed. Therefore, the relative installation location information of the target photovoltaic unit in the high-voltage direct current string may be obtained automatically.

In a possible design, the relative installation location information of the target photovoltaic unit in the high-voltage direct current string is pre-stored in the inverter.

According to the method for obtaining location information of a controller in this implementation, the relative installation location information of the target photovoltaic unit in the high-voltage direct current string is manually obtained and then pre-stored in the inverter.

In a possible design, the method further includes:

The inverter obtains signal feature information of each photovoltaic unit in a solar photovoltaic power generation system, where the signal feature information of a photovoltaic unit includes a communication identifier of the photovoltaic unit and a signal feature of another photovoltaic unit, the another photovoltaic unit is a photovoltaic unit other than a photovoltaic unit corresponding to the communication identifier of the photovoltaic unit, and the signal feature is a signal feature obtained when any photovoltaic unit in the solar photovoltaic power generation system communicates with the inverter or one photovoltaic unit in the solar photovoltaic power generation system, or a signal feature obtained when the any photovoltaic unit broadcasts; and The inverter determines, based on signal feature information of all photovoltaic units and according to a grouping rule, a quantity of high-voltage direct current strings included in the solar photovoltaic power generation system and a high-voltage direct current string to which each photovoltaic unit belongs, where the grouping rule is that photovoltaic units adjacent to a photovoltaic unit in a same high-voltage direct current string may be determined based on the signal feature information of the photovoltaic units.

According to the method for obtaining location information of a controller in this implementation, the quantity of high-voltage direct current strings included in the solar photovoltaic power generation system and the high-voltage direct current string to which each photovoltaic unit belongs may be determined.

According to a second aspect, this application provides an apparatus for obtaining location information of a controller, including: a first obtaining module, a first determining module, and a second determining module.

The first obtaining module is configured to obtain signal feature information of each photovoltaic unit in a high-voltage direct current string, where the signal feature information of a photovoltaic unit includes a communication identifier of the photovoltaic unit and a signal feature of another photovoltaic unit, and the another photovoltaic unit is a photovoltaic unit other than a photovoltaic unit corresponding to the communication identifier of the photovoltaic unit. For example, one high-voltage direct current string includes 24 photovoltaic units, and signal feature information of a photovoltaic unit 1 includes a communication identifier of the photovoltaic unit 1 and signal features of the other 23 photovoltaic units other than the photovoltaic unit 1. The signal feature is a signal feature obtained when any photovoltaic unit in the high-voltage direct current string communicates with an inverter or one photovoltaic unit in the high-voltage direct current string, or a signal feature obtained when the any photovoltaic unit broadcasts, and the photovoltaic unit includes one controller and at least one photovoltaic module.

The first determining module is configured to determine an installation sequence of all photovoltaic units based on signal feature information of all the photovoltaic units.

The second determining module is configured to determine relative installation location information of each photovoltaic unit based on relative installation location information of a target photovoltaic unit in the high-voltage direct current string and the installation sequence of all the photovoltaic units, where the target photovoltaic unit is at least one photovoltaic unit in the high-voltage direct current string.

In a possible design, the signal feature is a signal feature obtained when any photovoltaic unit in the high-voltage direct current string communicates with the inverter, and the first obtaining module is configured to:
communicate with each photovoltaic unit in the high-voltage direct current string in sequence;
send a location positioning request to each photovoltaic unit in the high-voltage direct current string in sequence; and
receive the signal feature information sent by each photovoltaic unit after each photovoltaic unit receives the location positioning request.

In a possible design, the signal feature is a signal feature obtained when any photovoltaic unit in the high-voltage direct current string communicates with the inverter, and the first obtaining module is configured to:
communicate with each photovoltaic unit in the high-voltage direct current string in sequence;
broadcast a location positioning request to each photovoltaic unit in the high-voltage direct current string; and
receive the signal feature information sent in sequence by each photovoltaic unit.

In a possible design, the first determining module is configured to:
determine a photovoltaic unit adjacent to each photovoltaic unit in sequence and based on the signal feature information of all photovoltaic units; and
perform sequencing based on the photovoltaic unit adjacent to each photovoltaic unit and a communication identifier of each photovoltaic unit, to obtain the installation sequence of all photovoltaic units.

In a possible design, the first obtaining module is further configured to:
obtain the relative installation location information of the target photovoltaic unit in the high-voltage direct current string.

In a possible design, the first obtaining module is configured to:
communicate with the target photovoltaic unit under a first condition, where the first condition is any one of disconnecting a direct current input switch of the inverter, disconnecting a positive electrode of the high-voltage direct current string, and disconnecting a negative electrode of the high-voltage direct current string; and
determine the relative installation location information of the target photovoltaic unit based on a received signal feature of the target photovoltaic unit; or
determine the relative installation location information of the target photovoltaic unit based on a signal feature of the target photovoltaic unit that is received before the first condition is executed and a signal feature of the target photovoltaic unit that is received after the first condition is executed.

In a possible design, the relative installation location information of the target photovoltaic unit in the high-voltage direct current string is pre-stored in the inverter.

In a possible design, the apparatus further includes:
a second obtaining module, configured to obtain signal feature information of each photovoltaic unit in a solar photovoltaic power generation system, where the signal feature information of a photovoltaic unit includes a communication identifier of the photovoltaic unit and a signal feature of another photovoltaic unit, and the signal feature is a signal feature obtained when any photovoltaic unit in the solar photovoltaic power generation system communicates with the inverter or one photovoltaic unit in the solar photovoltaic power generation system, or a signal feature obtained when the any photovoltaic unit broadcasts; and
a third determining module, configured to determine, based on signal feature information of all photovoltaic units and according to a grouping rule, a quantity of high-voltage direct current strings included in the solar photovoltaic power generation system and a high-voltage direct current string to which each photovoltaic unit belongs, where the grouping rule is that photovoltaic units adjacent to a photovoltaic unit in a same high-voltage direct current string may be determined based on the signal feature information of the photovoltaic units.

For beneficial effects of the apparatus for obtaining location information of a controller in the second aspect and the possible designs of the second aspect, refer to beneficial effects brought by the first aspect and the possible implementations of the first aspect. Details are not described herein again.

According to a third aspect, this application provides a device, including:
a processor; and
a memory, configured to store executable instructions of the processor, where
the processor is configured to perform, by executing the executable instructions, the method for obtaining location information of a controller in any one of the first aspect and the possible designs of the first aspect.

According to a fourth aspect, this application provides a readable storage medium. The readable storage medium stores executable instructions. When at least one processor of a device executes the executable instructions, the device performs the method for obtaining location information of a controller in any one of the first aspect and the possible designs of the first aspect.

According to a fifth aspect, this application provides a program product. The program product includes executable instructions, and the executable instructions are stored in a readable storage medium. At least one processor of a device may read the executable instructions from the readable storage medium, and the at least one processor executes the executable instructions, so that the device performs the method for obtaining location information of a controller in any one of the first aspect and the possible designs of the first aspect.

According to a sixth aspect, this application provides a chip. The chip is connected to a memory, or a memory is integrated into the chip. When a software program stored in the memory is executed, the method for obtaining location information of a controller in any one of the first aspect and the possible designs of the first aspect is implemented.

BRIEF DESCRIPTION OF DRAWINGS

FIG. 1 is a schematic structural diagram of a solar photovoltaic power generation system;

FIG. 2 is a flowchart of an embodiment of a method for obtaining location information of a controller according to this application;

FIG. 3 is a schematic diagram of a signal feature according to this application;

FIG. 4 is a flowchart of an embodiment of a method for obtaining location information of a controller according to this application;

DESCRIPTION OF EMBODIMENTS

Figure 5:
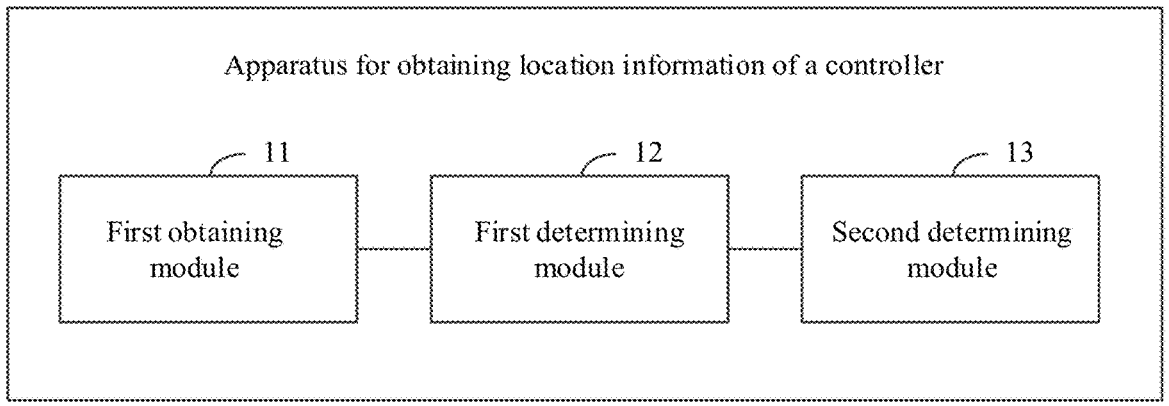
FIG. 5 is a schematic structural diagram of an embodiment of an apparatus for obtaining location information of a controller according to this application.

In embodiments of this application, a word such as "example" or "for example" is used to give an example, an illustration, or descriptions. Any embodiment or scheme described as "example" or "for example" in the embodiments of this application should not be explained as being more preferred or having more advantages than another embodiment or scheme. Exactly, use of the word such as "example" or "for example" is intended to present a related concept in a specific manner.

In description of this application, it should be noted that terms "first" and "second" are merely intended for a purpose of description, and shall not be understood as an indication or implication of relative importance. "At least one" means one or more, and "a plurality of" means two or more.

First, the following describes some terms in the embodiments of this application, to facilitate understanding of a person skilled in the art.

1. An inverter is a power supply for DC-to-AC conversion, that is, converting a direct current of a photovoltaic PV module into an alternating current.

2. A controller has at least one of a shutdown function, a monitoring function, and an optimization function. A controller with the optimization function is referred to as an optimizer, and the optimizer is a power supply for DC-to-DC conversion, that is, converting a direct current of a photovoltaic PV module into an adjustable direct current. A controller with the shutdown function is referred to as a shutdown device, and the shutdown device is an output device that can shut down a photovoltaic PV module.

3. A photovoltaic unit includes a controller and at least one photovoltaic module.

A solar photovoltaic power generation system includes a high-voltage direct current string and an inverter, where the high-voltage direct current string includes a plurality of photovoltaic units, and a photovoltaic unit includes a photovoltaic module and a controller. After actual installation and deployment, sequence number code of the controller under the same high-voltage direct current string and location information of the photovoltaic unit on which the controller is located need to be correspondingly stored for ease of management. In a current technology, location information of photovoltaic units on which controllers are located is manually recorded in sequence and imported into a management system. This is inefficient and error-prone. To resolve this problem, this application provides a method and apparatus for obtaining location information of a controller. After a solar photovoltaic power generation system is installed, under a preset frequency band, an inverter obtains signal feature information of each photovoltaic unit in a high-voltage direct current string, where the signal feature information includes a communication identifier of a current photovoltaic unit, a communication identifier of another photovoltaic unit, and a signal feature corresponding to the another photovoltaic unit; determines an installation sequence of all photovoltaic units based on signal feature information of all the photovoltaic units; and determines relative installation location information of each photovoltaic unit based on relative installation location information of a target photovoltaic unit in the high-voltage direct current string and the installation sequence of all the photovoltaic units. The relative installation location information of each photovoltaic unit is determined, and relative installation location information of a controller of each photovoltaic unit is also determined correspondingly. The relative installation location information of the target photovoltaic unit in the high-voltage direct current string may be manually obtained and then pre-stored in the inverter, or obtained by the inverter, so that the location information of the controller in the high-voltage direct current string in the photovoltaic system may be obtained full-automatically or semi-automatically. This saves labor and improves installation efficiency and operation and maintenance efficiency. The following describes in detail a specific procedure of the method for obtaining location information of a controller according to this application with reference to the accompanying drawings.

FIG. 1 is a schematic structural diagram of a solar photovoltaic power generation system. The method for obtaining location information of a controller provided in this application may be applied to the solar photovoltaic power generation system shown in FIG. 1. The solar photovoltaic power generation system includes at least one high-voltage direct current string and an inverter. In FIG. 1, one direct current high-voltage string is used as an example for description. As shown in FIG. 1, the solar photovoltaic power generation system includes a high-voltage direct current string 4 and an inverter 3. The high-voltage direct current string 4 is connected to the inverter 3, at least one photovoltaic module 1 uses one controller 2, one photovoltaic unit includes the photovoltaic module 1 and the controller 2, and outputs of controllers 2 are connected in series to form the high-voltage direct current string 4. In FIG. 1, the high-voltage direct current string 4 includes 24 photovoltaic units. In the solar photovoltaic power generation system, information is transmitted between the inverter 3 and the controller 2 through PLC. The inverter 3 is a PLC central coordinator, and the controller 2 is a PLC station. Information exchange such as service query and command control between the inverter 3 and the controller 2 is performed through the PLC. FIG. 1 shows location information of photovoltaic units from a positive electrode of the high-voltage direct current string to a negative electrode of the high-voltage direct current string, that is, 1 #, 2 #, . . . , and 24 #, which is location information of the controllers. For example, a PLC network starts a function of obtaining location information of the controller in response to a received instruction from an upper-level device or automatically based on a current working status of the system. The function of obtaining location information of the controller may be started after PLC networking and high-voltage direct current string grouping are completed, or may be started when actually required. This is not limited in this embodiment of this application. This application may further be applied to another security protection system based on the PLC.

FIG. 2 is a flowchart of an embodiment of a method for obtaining location information of a controller according to this application. As shown in FIG. 2, the method in this embodiment may include the following steps.

S101: An inverter obtains signal feature information of each photovoltaic unit in a high-voltage direct current string, where the signal feature information of a photovoltaic unit includes a communication identifier of the photovoltaic unit and a signal feature of another photovoltaic unit, the signal feature is a signal feature obtained when any photovoltaic unit in the high-voltage direct current string communicates with the inverter or one photovoltaic unit in the high-voltage direct current string, or a signal feature obtained when the any photovoltaic unit broadcasts, and the photovoltaic unit includes one controller and at least one photovoltaic module.

Specifically, S101 may be performed under a preset communication frequency band. The preset communication frequency band may not be a current communication frequency band, different communication frequency bands have different radiation to external space and different distribution capacitance to the ground, and the preset communication frequency band is set to better distinguish signal features of different photovoltaic units. The signal feature is one of signal strength, signal attenuation, or signal impedance.

Under the preset communication frequency band, the inverter communicates with each photovoltaic unit in the high-voltage direct current string. Specifically, the inverter communicates with each photovoltaic unit through PLC, and further obtains the signal feature information of each photovoltaic unit, where the signal feature information of a photovoltaic unit includes a communication identifier of any photovoltaic unit in the high-voltage direct current string and a signal feature of another photovoltaic unit. For example, the high-voltage direct current string includes 6 photovoltaic units, and signal feature information sent by a photovoltaic unit 1 is shown in Table 1.

| Communication identifier of the photovoltaic unit 1 | Communication identifier of a photovoltaic unit 2 | Signal feature 1 |
|---|---|---|
| | Communication identifier of a photovoltaic unit 3 | Signal feature 2 |
| | Communication identifier of a photovoltaic unit 4 | Signal feature 3 |
| | Communication identifier of a photovoltaic unit 5 | Signal feature 4 |
| | Communication identifier of a photovoltaic unit 6 | Signal feature 5 |

The communication identifier of the photovoltaic unit may be a media access control (MAC) address or a logical address of the photovoltaic unit, or may be another communication address.

One photovoltaic unit includes one controller and at least one photovoltaic module, and the controller may be an optimizer or a shutdown device.

In an implementation, when the signal feature of the photovoltaic unit is a signal feature obtained when any photovoltaic unit in the high-voltage direct current string communicates with the inverter, and that an inverter obtains signal feature information of each photovoltaic unit in a high-voltage direct current string may specifically be as follows.

S1011: The inverter communicates with each photovoltaic unit in the high-voltage direct current string in sequence.

Specifically, the inverter may communicate with each photovoltaic unit in the high-voltage direct current string in sequence under the preset communication frequency band. For example, the inverter sends a communication request to a first photovoltaic unit, and after receiving the communication request, the first photovoltaic unit sends information to the inverter. In this case, another photovoltaic unit stores a signal feature that is received when the first photovoltaic unit communicates with the inverter. Then, similarly, the inverter sends a communication request to a second photovoltaic unit, and after receiving the communication request, the second photovoltaic unit sends information to the inverter. In this case, another photovoltaic unit stores a signal feature that is received when the second photovoltaic unit communicates with the inverter. Similarly, when the inverter sends a communication request to an $N^{th}$ photovoltaic unit, where N is a total quantity of photovoltaic units, after receiving the communication request, the $N^{th}$ photovoltaic unit sends information to the inverter. In this case, another photovoltaic unit stores a signal feature that is received when the $N^{th}$ photovoltaic unit communicates with the inverter. If the high-voltage direct current string includes N photovoltaic units, each photovoltaic unit stores (N−1) signal features, and correspondingly stores communication identifiers of the photovoltaic units during storage.

S1012: The inverter sends a location positioning request to each photovoltaic unit in the high-voltage direct current string in sequence.

S1013: The inverter receives the signal feature information sent by each photovoltaic unit after each photovoltaic unit receives the location positioning request.

After S1011, each photovoltaic unit stores a signal feature obtained when another photovoltaic unit communicates with the inverter, and then the inverter sends a location positioning request to each photovoltaic unit, to obtain the signal feature that is stored in each photovoltaic unit and that is obtained when another photovoltaic unit communicates with the inverter, that is, obtain the signal feature information of each photovoltaic unit.

In another implementation, that an inverter obtains signal feature information of each photovoltaic unit in a high-voltage direct current string may specifically be as follows.

S1011': The inverter communicates with each photovoltaic unit in the high-voltage direct current string in sequence.

For details, refer to the description in S1011. Details are not described herein again.

S1012': The inverter broadcasts a location positioning request to each photovoltaic unit in the high-voltage direct current string in sequence.

S1013': The inverter receives the signal feature information sent in sequence by each photovoltaic unit.

After S1011', each photovoltaic unit stores a signal feature obtained when another photovoltaic unit communicates with the inverter, and then the inverter broadcasts the location positioning request to each photovoltaic unit. When the location positioning request is broadcast, a preset interval may further be carried, that is, an interval at which each photovoltaic unit sends the signal feature information in sequence. For example, a first photovoltaic unit first sends signal feature information. When the first photovoltaic unit communicates with the inverter, a second photovoltaic unit may receive a signal feature of communication, and send the signal feature information to the inverter after the preset interval, and so on, until an $N^{th}$ photovoltaic unit sends signal feature information to the inverter.

When the signal feature of the photovoltaic unit is a signal feature obtained when the photovoltaic unit communicates with a photovoltaic unit in the high-voltage direct current string, a photovoltaic unit is replaced with an inverter to perform S1011 or S1011', and then the inverter performs S1012 and S1013 or S1012' and S1013', to obtain the signal feature information of each photovoltaic unit in the high-voltage direct current string.

When the signal feature of the photovoltaic unit is a signal feature obtained when any photovoltaic unit broadcasts, and when a photovoltaic unit broadcasts, another photovoltaic unit stores the received signal feature obtained when the photovoltaic unit broadcasts, and then the inverter performs S1012 and S1013 or S1012' and S1013', to obtain the signal feature information of each photovoltaic unit in the high-voltage direct current string.

S102: The inverter determines an installation sequence of all photovoltaic units based on signal feature information of all the photovoltaic units.

Specifically, that the inverter determines an installation sequence of all photovoltaic units based on signal feature information of all the photovoltaic units may specifically be as follows.

S1021: The inverter determines a photovoltaic unit adjacent to each photovoltaic unit in sequence and based on the signal feature information of all the photovoltaic units.

Specifically, the signal feature information includes a communication identifier of a current photovoltaic unit and a signal feature obtained when another photovoltaic unit communicates with the inverter. For each photovoltaic unit, two photovoltaic units with strongest signal features, that is, photovoltaic units adjacent to the photovoltaic unit, are first determined from signal features of other photovoltaic units.

Specifically, a fifth photovoltaic unit shown in FIG. 1 is used as an example for description. FIG. 3 is a schematic diagram of a signal feature according to this application. As shown in FIG. 3, photovoltaic units adjacent to the fifth photovoltaic unit are photovoltaic units 4 # and 6 #. When the fifth photovoltaic unit sends information to the inverter, signals are coupled, and then transmitted along the photovoltaic units 4 # and 6 # respectively. Some signals reach to the ground after passing through a photovoltaic module, namely, a distributed capacitance to the ground 5, and some signals are radiated to the space. Signals continue to be transmitted to photovoltaic units 3 # and 7 #. Because signals are lost in another way, the photovoltaic units 4 # and 6 # that are adjacent to the fifth photovoltaic unit have strongest sampling signals and strongest signal features.

S1022: The inverter performs sequencing, based on the photovoltaic unit adjacent to each photovoltaic unit and a communication identifier of each photovoltaic unit, to obtain the installation sequence of all the photovoltaic units.

Specifically, the high-voltage direct current string shown in FIG. 1 is used as an example. After S1022, the installation sequence of all the photovoltaic units may be obtained, that is, a first photovoltaic unit, a second photovoltaic unit, . . . , and an $N^{th}$ photovoltaic unit.

S103: The inverter determines relative installation location information of each photovoltaic unit based on relative installation location information of a target photovoltaic unit in the high-voltage direct current string and the installation sequence of all the photovoltaic units, where the target photovoltaic unit is at least one photovoltaic unit in the high-voltage direct current string.

The target photovoltaic unit is at least one photovoltaic unit in the high-voltage direct current string, may be a first photovoltaic unit or a last photovoltaic unit in the high-voltage direct current string, or may be at least one photovoltaic unit adjacent to a first photovoltaic unit, or may be at least one photovoltaic unit adjacent to a last photovoltaic unit. To be specific, the installation sequence of all the photovoltaic units may be determined. The relative installation location information of each photovoltaic unit may be obtained based on relative installation location information of at least one photovoltaic unit in the high-voltage direct current string and the installation sequence of all the photovoltaic units, to obtain location information of a controller of each photovoltaic unit. In a networking process, the inverter learns of a communication identifier of each photovoltaic unit and sequence number code of the controller of the photovoltaic unit. After the location information of the controller of each photovoltaic unit is obtained by using the method provided in this application, the sequence number code and the location information of the controller of each photovoltaic unit may be obtained. This saves labor and improves installation efficiency and operation and maintenance efficiency.

In an implementation, the relative installation location information of the target photovoltaic unit in the high-voltage direct current string is pre-stored in the inverter. The relative installation location information of the target photovoltaic unit may be manually obtained and then pre-stored in the inverter. This may be referred to as a semi-automatic manner.

In an implementation, before S101, the method in this embodiment may further include the following step.

S104: The inverter obtains the relative installation location information of the target photovoltaic unit in the high-voltage direct current string.

Specifically, S104 may be as follows: The inverter communicates with the target photovoltaic unit under a first condition, where the first condition is any one of disconnecting a direct current input switch of the inverter, disconnecting a positive electrode of the high-voltage direct current string, and disconnecting a negative electrode of the high-voltage direct current string; and the inverter determines the relative installation location information of the target photovoltaic unit based on a received signal feature of the target photovoltaic unit; or the inverter determines the relative installation location information of the target photovoltaic unit based on a signal feature of the target photovoltaic unit that is received before the first condition is executed and a signal feature of the target photovoltaic unit that is received after the first condition is executed.

It should be noted that in this embodiment, one high-voltage direct current string is used as an example for description. When the solar photovoltaic power generation system includes a plurality of high-voltage direct current strings, for each high-voltage direct current string, location information of a controller in each high-voltage direct current string may be obtained in sequence by using the foregoing method in this embodiment.

In this embodiment, the high-voltage direct current strings in the solar photovoltaic power generation system have been grouped, that is, the inverter has learned of grouping information of the high-voltage direct current strings. In an implementation, when the inverter does not learn of the grouping information of the high-voltage direct current strings, before S101, the grouping information of the high-voltage direct current strings further needs to be determined, and the method in this embodiment further include the following step.

S105: The inverter obtains signal feature information of each photovoltaic unit in the solar photovoltaic power generation system, where the signal feature information of a photovoltaic unit includes a communication identifier of the photovoltaic unit and a signal feature of another photovoltaic unit, and the signal feature is a signal feature obtained when any photovoltaic unit in the solar photovoltaic power generation system communicates with the inverter or one photovoltaic unit in the solar photovoltaic power generation system, or a signal feature obtained when the any photovoltaic unit broadcasts.

Specifically, in an implementation, when the signal feature of the photovoltaic unit is a signal feature obtained when another photovoltaic unit communicates with the inverter, and that the inverter obtains the signal feature information of each photovoltaic unit in the solar photovoltaic power generation system may specifically be as follows.

S1051': The inverter communicates with each photovoltaic unit in the solar photovoltaic power generation system in sequence under the preset communication frequency band.

When the inverter communicates with one of the photovoltaic units, another photovoltaic unit stores a signal feature obtained when the photovoltaic unit communicates with the inverter.

S1052: The inverter sends a location positioning request to each photovoltaic unit in sequence.

S1053: The inverter receives the signal feature information sent by each photovoltaic unit after each photovoltaic unit receives the location positioning request.

In another implementation, that the inverter obtains signal feature information of each photovoltaic unit in the solar photovoltaic power generation system may specifically be as follows.

S1051': The inverter communicates with each photovoltaic unit in the solar photovoltaic power generation system in sequence under the preset communication frequency band.

When the inverter communicates with one of the photovoltaic units, another photovoltaic unit stores a signal feature obtained when the photovoltaic unit communicates with the inverter.

S1052': The inverter broadcasts a location positioning request to each photovoltaic unit in the solar photovoltaic power generation system in sequence.

S1053': The inverter receives the signal feature information sent in sequence by each photovoltaic unit.

After S1051', each photovoltaic unit stores a signal feature obtained when another photovoltaic unit communicates with the inverter, and then the inverter broadcasts the location positioning request to each photovoltaic unit. When the location positioning request is broadcast, a preset interval may further be carried, that is, an interval at which each photovoltaic unit sends the signal feature information in sequence. For example, a first photovoltaic unit first sends signal feature information. When the first photovoltaic unit communicates with the inverter, a second photovoltaic unit may receive a signal feature of communication, and send the signal feature information to the inverter after the preset interval, and so on, until an $N^{th}$ photovoltaic unit sends signal feature information to the inverter.

When the signal feature of the photovoltaic unit is a signal feature obtained when the photovoltaic unit communicates with a photovoltaic unit in the high-voltage direct current string, a photovoltaic unit is replaced with an inverter to perform S1051 or S1051', and then the inverter performs S1052 and S1053 or S1052' and S1053', to obtain the signal feature information of each photovoltaic unit in the high-voltage direct current string.

When the signal feature of the photovoltaic unit is a signal feature obtained when any photovoltaic unit broadcasts, and when a photovoltaic unit broadcasts, another photovoltaic stores the received signal feature obtained when the photovoltaic unit broadcasts, and then the inverter performs S1052 and S1053 or S1052' and S1053', to obtain the signal feature information of each photovoltaic unit in the high-voltage direct current string.

S106: The inverter determines, based on signal feature information of all photovoltaic units and according to a grouping rule, a quantity of high-voltage direct current strings included in the solar photovoltaic power generation system and a high-voltage direct current string to which each photovoltaic unit belongs, where the grouping rule is that photovoltaic units adjacent to a photovoltaic unit in a same high-voltage direct current string may be determined based on the signal feature information of the photovoltaic units.

Specifically, S106 may specifically be as follows. First, a first photovoltaic unit is randomly selected, for example, a photovoltaic unit 1, and a photovoltaic unit adjacent to the first photovoltaic unit is determined based on signal feature information of all photovoltaic units, for example, the photovoltaic unit or photovoltaic units adjacent to the photovoltaic unit 1 is a photovoltaic unit 2 or are a photovoltaic unit 2 and a photovoltaic unit 3. Then, a photovoltaic unit that is adjacent to the photovoltaic unit adjacent to the first photovoltaic unit is determined based on signal feature information of the photovoltaic unit adjacent to the first photovoltaic unit and signal feature information of a photovoltaic unit other than the first photovoltaic unit and the photovoltaic unit adjacent to the first photovoltaic unit, that is, a photovoltaic unit adjacent to the photovoltaic unit 2 or to the photovoltaic unit 2 and the photovoltaic unit 3 is determined. Then, a photovoltaic unit that is adjacent to the photovoltaic unit adjacent to the photovoltaic unit 2 or to the photovoltaic unit 2 and the photovoltaic unit 3 is determined, and the determined photovoltaic units are included in a set corresponding to a high-voltage direct current string. Until there is no photovoltaic unit adjacent to a last photovoltaic unit or a photovoltaic unit adjacent to a last photovoltaic unit is a photovoltaic unit in the set, the determining process stops, and the determined photovoltaic units in the set are determined as photovoltaic units in a high-voltage direct current string. Then, the foregoing process is continued based on the signal feature information of the remaining photovoltaic units, to determine the photovoltaic units in a second high-voltage direct current string, until all high-voltage direct current strings included in the solar photovoltaic power generation system are determined.

By performing the foregoing steps, the inverter may determine the grouping information of the high-voltage direct current strings, and then perform S101 to S103, to obtain relative installation location information of each photovoltaic unit in each high-voltage direct current string, so as to obtain relative installation position information of each controller in each high-voltage direct current string.

According to the method for obtaining location information of a controller in this embodiment, the inverter obtains the signal feature information of each photovoltaic unit in the high-voltage direct current string, where the signal feature information of a photovoltaic unit includes the communication identifier of the photovoltaic unit, a communication identifier of another photovoltaic unit, and the signal feature corresponding to the another photovoltaic unit; determines the installation sequence of all photovoltaic units based on the signal feature information of all the photovoltaic units; and determines the relative installation location information of each photovoltaic unit based on the relative installation location information of the target photovoltaic unit in the high-voltage direct current string and the installation sequence of all the photovoltaic units. The relative installation location information of each photovoltaic unit is determined, and location information of a controller of each photovoltaic unit is also determined correspondingly. The relative installation location information of the target photovoltaic unit in the high-voltage direct current string may be manually obtained and then pre-stored in the inverter, or obtained by the inverter, so that the location information of the controller in the high-voltage direct current string in a photovoltaic system may be obtained full-automatically or semi-automatically. This saves labor and improves installation efficiency and operation and maintenance efficiency.

The technical solution of the method embodiment shown in FIG. 2 is described in detail below by using a specific embodiment.

FIG. 4 is a flowchart of an embodiment of a method for obtaining location information of a controller according to this application. As shown in FIG. 4, the method in this embodiment may include the following steps.

S201: An inverter obtains relative installation location information of a target photovoltaic unit in a high-voltage direct current string, where the target photovoltaic unit is at least one photovoltaic unit in the high-voltage direct current string.

The target photovoltaic unit may be a first photovoltaic unit or a last photovoltaic unit in the high-voltage direct current string, or may be at least one photovoltaic unit adjacent to a first photovoltaic unit, or may be at least one photovoltaic unit adjacent to a last photovoltaic unit.

Specifically, three implementations are disclosed as follows.

Implementation 1: The inverter communicates with the target photovoltaic unit when disconnecting a direct current input switch of the inverter, and the inverter determines the relative installation location information of the target photovoltaic unit based on a received signal feature of the target photovoltaic unit; or the inverter communicates with the target photovoltaic unit when disconnecting a direct current input switch of the inverter, and the inverter determines the relative installation location information of the target photovoltaic unit based on a received signal feature of the target photovoltaic unit when the direct current input switch of the inverter is not disconnected and a received signal feature of the target photovoltaic unit when the direct current input switch of the inverter is disconnected.

Implementation 2: The inverter communicates with the target photovoltaic unit when a positive electrode of the high-voltage direct current string is disconnected, and the inverter determines the relative installation location information of the target photovoltaic unit based on a received signal feature of the target photovoltaic unit; or the inverter communicates with the target photovoltaic unit when a positive electrode of the high-voltage direct current string is disconnected, and the inverter determines the relative installation location information of the target photovoltaic unit based on a received signal feature of the target photovoltaic unit when the positive electrode of the high-voltage direct current string is not disconnected (that is, in a normal condition) and a received signal feature of the target photovoltaic unit when the positive electrode of the high-voltage direct current string is disconnected.

Implementation 3: The inverter communicates with the target photovoltaic unit when a negative electrode of the high-voltage direct current string is disconnected, and the inverter determines the relative installation location information of the target photovoltaic unit based on a received signal feature of the target photovoltaic unit; or the inverter communicates with the target photovoltaic unit when a negative electrode of the high-voltage direct current string is disconnected, and the inverter determines the relative installation location information of the target photovoltaic unit based on a received signal feature of the target photovoltaic unit when the negative electrode of the high-voltage direct current string is not disconnected and a received signal feature of the target photovoltaic unit when the negative electrode of the high-voltage direct current string is disconnected.

S202: The inverter obtains signal feature information of each photovoltaic unit in the high-voltage direct current string, where the signal feature information of a photovoltaic unit includes a communication identifier of the photovoltaic unit and a signal feature obtained when another photovoltaic unit communicates with the inverter.

Specifically, the signal feature information may be obtained by performing S1011 to S1013 or S1011' to S1013'. For a detailed process, refer to description of S1011 to S1013 or S1011' to S1013' in the embodiment shown in FIG. 2. Details are not described herein again.

S203: The inverter determines an installation sequence of all photovoltaic units based on signal feature information of all the photovoltaic units.

Specifically, the inverter first determines a photovoltaic unit adjacent to each photovoltaic unit in sequence and based on the signal feature information of all the photovoltaic units, and performs sequencing based on the photovoltaic unit adjacent to each photovoltaic unit and a communication identifier of each photovoltaic unit, to obtain the installation sequence of all the photovoltaic units.

S204: The inverter determines relative installation location information of each photovoltaic unit based on the relative installation location information of the target photovoltaic unit in the high-voltage direct current string and the installation sequence of all the photovoltaic units, and obtains location information of a controller of each photovoltaic unit based on the relative installation location information of each photovoltaic unit.

FIG. 5 is a schematic structural diagram of an embodiment of an apparatus for obtaining location information of a controller according to this application. As shown in FIG. 5, the apparatus in this embodiment may include a first obtaining module 11, a first determining module 12, and a second determining module 13.

The first obtaining module 11 is configured to obtain signal feature information of each photovoltaic unit in a high-voltage direct current string, where the signal feature information of a photovoltaic unit includes a communication identifier of the photovoltaic unit and a signal feature of another photovoltaic unit, the signal feature is a signal feature obtained when any photovoltaic unit in the high-voltage direct current string communicates with the inverter or one photovoltaic unit in the high-voltage direct current string, or a signal feature obtained when the any photovoltaic unit broadcasts, and the photovoltaic unit includes one controller and at least one photovoltaic module.

The first determining module 12 is configured to determine an installation sequence of all photovoltaic units based on signal feature information of all the photovoltaic units.

The second determining module 13 is configured to determine relative installation location information of each photovoltaic unit based on relative installation location information of a target photovoltaic unit in the high-voltage direct current string and the installation sequence of all the photovoltaic units, where the target photovoltaic unit is at least one photovoltaic unit in the high-voltage direct current string.

Further, the signal feature is a signal feature obtained when any photovoltaic unit in the high-voltage direct current string communicates with the inverter, and the first obtaining module 11 is configured to:

communicate with each photovoltaic unit in the high-voltage direct current string in sequence;

send a location positioning request to each photovoltaic unit in the high-voltage direct current string in sequence; and receive the signal feature information sent by each photovoltaic unit after each photovoltaic unit receives the location positioning request.

Further, the signal feature is a signal feature obtained when any photovoltaic unit in the high-voltage direct current string communicates with the inverter, and the first obtaining module 11 is configured to:

communicate with each photovoltaic unit in the high-voltage direct current string in sequence;

broadcast a location positioning request to each photovoltaic unit in the high-voltage direct current string; and receive the signal feature information sent in sequence by each photovoltaic unit.

Further, the first determining module 12 is configured to:

determine a photovoltaic unit adjacent to each photovoltaic unit in sequence and based on the signal feature information of all the photovoltaic units; and perform sequencing based on the photovoltaic unit adjacent to each photovoltaic unit and a communication identifier of each photovoltaic unit, to obtain the installation sequence of all the photovoltaic units.

Optionally, the first obtaining module 11 is further configured to:

obtain the relative installation location information of the target photovoltaic unit in the high-voltage direct current string.

Further, the first obtaining module 11 is configured to:

communicate with the target photovoltaic unit under a first condition, where the first condition is any one of disconnecting a direct current input switch of the inverter, disconnecting a positive electrode of the high-voltage direct current string, and disconnecting a negative electrode of the high-voltage direct current string; and determine the relative installation location information of the target photovoltaic unit based on a received signal feature of the target photovoltaic unit; or determine the relative installation location information of the target photovoltaic unit based on a signal feature of the target photovoltaic unit that is received before the first condition is executed and a signal feature of the target photovoltaic unit that is received after the first condition is executed.

Optionally, the relative installation location information of the target photovoltaic unit in the high-voltage direct current string is pre-stored in the inverter.

The apparatus in this embodiment may be configured to execute the technical solutions of the method embodiment shown in FIG. 2. Implementation principles and technical effects are similar, and details are not described herein again.

Figure 6:
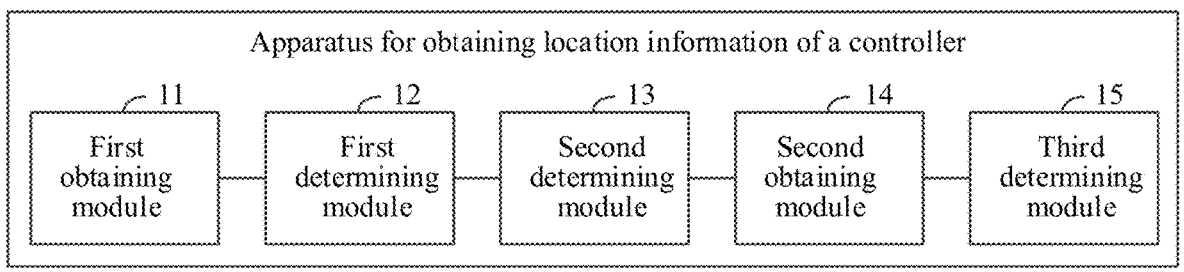
FIG. 6 is a schematic structural diagram of an embodiment of an apparatus for obtaining location information of a controller according to this application.

FIG. 6 is a schematic structural diagram of an embodiment of an apparatus for obtaining location information of a controller according to this application. As shown in FIG. 6, the apparatus in this embodiment may further include a second obtaining module 14 and a third determining module 15 based on the structure of the apparatus shown in FIG. 5.

The second obtaining module 14 is configured to obtain signal feature information of each photovoltaic unit in a solar photovoltaic power generation system, where the signal feature information of a photovoltaic unit includes a communication identifier of the photovoltaic unit and a signal feature of another photovoltaic unit, and the signal feature is a signal feature obtained when any photovoltaic unit in the solar photovoltaic power generation system communicates with the inverter or one photovoltaic unit in the solar photovoltaic power generation system, or a signal feature obtained when the any photovoltaic unit broadcasts.

The third determining module 15 is configured to determine, based on signal feature information of all photovoltaic units and according to a grouping rule, a quantity of high-voltage direct current strings included in the solar photovoltaic power generation system and a high-voltage direct current string to which each photovoltaic unit belongs, where the grouping rule is that photovoltaic units adjacent to a photovoltaic unit in a same high-voltage direct current string may be determined based on the signal feature information of the photovoltaic units.

The apparatus in this embodiment may be configured to execute the technical solutions of the method embodiment shown in FIG. 2. Implementation principles and technical effects are similar, and details are not described herein again.

In this application, the apparatus for obtaining location information of a controller may be divided into functional modules based on the foregoing method examples. For example, functional modules corresponding to functions may be obtained through division, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 7:
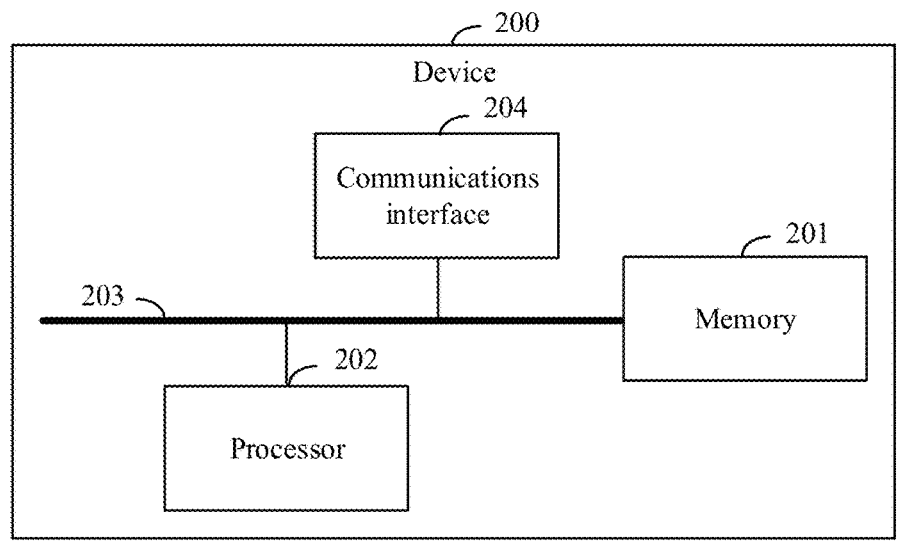
FIG. 7 is a schematic structural diagram of a device according to this application.

FIG. 7 is a schematic structural diagram of a device according to this application. As shown in FIG. 7, the device 200 includes a memory 201 and a processor 202.

The memory 201 is configured to store a computer program.

The processor 202 is configured to execute the computer program stored in the memory, to implement the printing method in the foregoing embodiments. For details, refer to related description in the foregoing method embodiments.

Optionally, the memory 201 may be independent, or may be integrated with the processor 202.

When the memory 201 is a device independent of the processor 202, the device 200 may further include:

a bus 203, configured to connect the memory 201 and the processor 202.

Optionally, this embodiment further includes a communications interface 204. The communications interface 204 may be connected to the processor 202 by using the bus 203. The processor 202 may control the communications interface 203 to implement the foregoing receiving and sending functions of the device 200.

The device may be configured to perform steps and/or procedures corresponding to the inverter in the foregoing method embodiments.

This application further provides a readable storage medium. The readable storage medium stores executable instructions. When at least one processor of a device executes the executable instructions, the device performs the method for obtaining location information of a controller in the foregoing method embodiments.

This application further provides a program product. The program product includes executable instructions, and the executable instructions are stored in a readable storage medium. At least one processor of a device may read the executable instructions from the readable storage medium, and the at least one processor executes the executable instructions, so that the device performs the method for obtaining location information of a controller in the foregoing method embodiments.

This application further provides a chip. The chip is connected to a memory, or a memory is integrated into the chip. When a software program stored in the memory is executed, the method for obtaining location information of a controller in the foregoing method embodiments is implemented.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, a procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A method for obtaining location information of a controller, comprising:
   obtaining, by an inverter, signal feature information of each photovoltaic unit in a high-voltage direct current string, wherein the signal feature information of each photovoltaic unit comprises a communication identifier of the photovoltaic unit and a signal feature of another photovoltaic unit, the signal feature of each photovoltaic unit is a signal feature obtained when the photovoltaic unit in the high-voltage direct current string communicates with the inverter or any other photovoltaic unit in the high-voltage direct current string, or a signal feature obtained when the photovoltaic unit broadcasts, and the photovoltaic unit comprises one controller and at least one photovoltaic module;
   determining, by the inverter, an installation sequence of all photovoltaic units in the high-voltage direct current string based on the signal feature information of all the photovoltaic units; and
   determining, by the inverter, relative installation location information of each photovoltaic unit based on relative installation location information of a target photovoltaic unit in the high-voltage direct current string and the installation sequence of all the photovoltaic units, wherein the target photovoltaic unit is at least one photovoltaic unit in the high-voltage direct current string.

2. The method according to claim 1, wherein the signal feature of each photovoltaic unit is a signal feature obtained when the photovoltaic unit in the high-voltage direct current string communicates with the inverter, and the obtaining, by the inverter, signal feature information of each photovoltaic unit in the high-voltage direct current string comprises:
   communicating, by the inverter, with each photovoltaic unit in the high-voltage direct current string in sequence;
   sending, by the inverter, a location positioning request to each photovoltaic unit in the high-voltage direct current string in sequence; and
   receiving, by the inverter, the signal feature information sent by each photovoltaic unit after each photovoltaic unit receives the location positioning request.

3. The method according to claim 1, wherein the signal feature is a signal feature obtained when the photovoltaic unit in the high-voltage direct current string communicates with the inverter, and the obtaining, by the inverter, signal feature information of each photovoltaic unit in the high-voltage direct current string comprises:
   communicating, by the inverter, with each photovoltaic unit in the high-voltage direct current string in sequence;

broadcasting, by the inverter, a location positioning request to each photovoltaic unit in the high-voltage direct current string; and receiving, by the inverter, the signal feature information sent in sequence by each photovoltaic unit.

4. The method according to claim 1, wherein the determining, by the inverter, the installation sequence of all photovoltaic units in the high-voltage direct current string based on the signal feature information of all the photovoltaic units comprises:

determining, by the inverter, a photovoltaic unit adjacent to each photovoltaic unit in sequence and based on the signal feature information of all the photovoltaic units; and performing sequencing, by the inverter, based on the photovoltaic unit adjacent to each photovoltaic unit and a communication identifier of each photovoltaic unit, to obtain the installation sequence of all the photovoltaic units in the high-voltage direct current string.

5. The method according to claim 1, wherein the method further comprises:

obtaining, by the inverter, the relative installation location information of the target photovoltaic unit in the high-voltage direct current string.

6. The method according to claim 5, wherein the obtaining, by the inverter, the relative installation location information of the target photovoltaic unit in the high-voltage direct current string comprises:

communicating, by the inverter, with the target photovoltaic unit under a first condition, wherein the first condition is any one of disconnecting a direct current input switch of the inverter, disconnecting a positive electrode of the high-voltage direct current string, and disconnecting a negative electrode of the high-voltage direct current string; and determining, by the inverter, the relative installation location information of the target photovoltaic unit based on a received signal feature of the target photovoltaic unit; or determining, by the inverter, the relative installation location information of the target photovoltaic unit based on a signal feature of the target photovoltaic unit that is received before the first condition is executed and a signal feature of the target photovoltaic unit that is received after the first condition is executed.

7. The method according to claim 1, wherein the relative installation location information of the target photovoltaic unit in the high-voltage direct current string is pre-stored in the inverter.

8. The method according to claim 1, wherein the method further comprises:

obtaining, by the inverter, signal feature information of each photovoltaic unit in a solar photovoltaic power generation system, wherein the signal feature information of each photovoltaic unit comprises a communication identifier of the photovoltaic unit and a signal feature of another photovoltaic unit, and the signal feature for each photovoltaic unit is a signal feature obtained when the photovoltaic unit in the solar photovoltaic power generation system communicates with the inverter or any other photovoltaic unit in the solar photovoltaic power generation system, or a signal feature obtained when the photovoltaic unit broadcasts; and determining, by the inverter based on the signal feature information of all photovoltaic units and according to a grouping rule, a quantity of high-voltage direct current strings comprised in the solar photovoltaic power generation system and a high-voltage direct current string to which each photovoltaic unit belongs, wherein the grouping rule is that photovoltaic units adjacent to another photovoltaic unit in a same high-voltage direct current string may be determined based on the signal feature information of the photovoltaic units.

9. A device, comprising:

a processor; and a memory, configured to store executable instructions of the processor, wherein the processor is configured to perform, by executing the executable instructions, the method for obtaining location information of a controller according to claim 1.

10. A computer readable storage medium storing executable instructions, and when at least one processor of a device executes the executable instructions, the device performs the method for obtaining location information of a controller according to claim 1.

11. An apparatus for obtaining location information of a controller, comprising:

an inverter configured to:

obtain signal feature information of each photovoltaic unit in a high-voltage direct current string, wherein the signal feature information of each photovoltaic unit comprises a communication identifier of the photovoltaic unit and a signal feature of another photovoltaic unit, the signal feature of each photovoltaic unit is a signal feature obtained when the photovoltaic unit in the high-voltage direct current string communicates with an inverter or any other photovoltaic unit in the high-voltage direct current string, or a signal feature obtained when the the photovoltaic unit broadcasts, and the photovoltaic unit comprises one controller and at least one photovoltaic module;

determine an installation sequence of all photovoltaic units in the high-voltage direct current string based on the signal feature information of all the photovoltaic units; and determine relative installation location information of each photovoltaic unit based on installation location information of a target photovoltaic unit in the high-voltage direct current string and the installation sequence of all the photovoltaic units, wherein the target photovoltaic unit is at least one photovoltaic unit in the high-voltage direct current string.

12. The apparatus according to claim 11, wherein the inverter is further configured to:

determine a photovoltaic unit adjacent to each photovoltaic unit in sequence and based on the signal feature information of all the photovoltaic units; and perform sequencing based on the photovoltaic unit adjacent to each photovoltaic unit and a communication identifier of each photovoltaic unit, to obtain the installation sequence of all the photovoltaic units.

13. The apparatus according to claim 11, wherein the inverter is further configured to:

obtain the relative installation location information of the target photovoltaic unit in the high-voltage direct current string.

14. The apparatus according to claim 13, wherein the inverter is configured to:

communicate with the target photovoltaic unit under a first condition, wherein the first condition is any one of disconnecting a direct current input switch of the inverter, disconnecting a positive electrode of the high-voltage direct current string, and disconnecting a negative electrode of the high-voltage direct current string; and determine the relative installation location information of the target photovoltaic unit based on a received signal feature of the target photovoltaic unit; or determine the relative installation location information of the target photovoltaic unit based on a signal feature of the target photovoltaic unit that is received before the first condition is executed and a signal feature of the target photovoltaic unit that is received after the first condition is executed.

15. The apparatus according to claim 11, wherein the relative installation location information of the target photovoltaic unit in the high-voltage direct current string is pre-stored in the inverter.

16. The apparatus according to claim 11, wherein the inverter is further configured to:

obtain signal feature information of each photovoltaic unit in a solar photovoltaic power generation system, wherein the signal feature information for each photovoltaic unit comprises a communication identifier of the photovoltaic unit and a signal feature of another photovoltaic unit, and the signal feature for each photovoltaic unit is a signal feature obtained when the photovoltaic unit in the solar photovoltaic power generation system communicates with the inverter or any other photovoltaic unit in the solar photovoltaic power generation system, or a signal feature obtained when the photovoltaic unit broadcasts; and determine, based on the signal feature information of all photovoltaic units and according to a grouping rule, a quantity of high-voltage direct current strings comprised in the solar photovoltaic power generation system and a high-voltage direct current string to which each photovoltaic unit belongs, wherein the grouping rule is that photovoltaic units adjacent to another photovoltaic unit in a same high-voltage direct current string may be determined based on the signal feature information of the photovoltaic units.

17. The apparatus according to claim 11, wherein the signal feature of each photovoltaic unit is a signal feature obtained when the photovoltaic unit in the high-voltage direct current string communicates with the inverter, and the inverter is further configured to:

communicate with each photovoltaic unit in the high-voltage direct current string in sequence;

send a location positioning request to each photovoltaic unit in the high-voltage direct current string in sequence; and receive the signal feature information sent by each photovoltaic unit after each photovoltaic unit receives the location positioning request.

18. The apparatus according to claim 11, wherein the signal feature of each photovoltaic unit is a signal feature obtained when the photovoltaic unit in the high-voltage direct current string communicates with the inverter, and the inverter is further configured to:

communicate with each photovoltaic unit in the high-voltage direct current string in sequence;

broadcast a location positioning request to each photovoltaic unit in the high-voltage direct current string; and receive the signal feature information sent in sequence by each photovoltaic unit.

* * * * *